United States Patent Office 3,492,266
Patented Jan. 27, 1970

3,492,266
POLYAMIDES STABILIZED WITH POTASSIUM OR SODIUM CYANOCUPRATES
Karl Heinz Hermann, Krefeld-Bockum, Germany, assignor to Farbenfabriken Bayer Aktiengesellschaft, Leverkusen, Germany, a corporation of Germany
No Drawing. Filed Jan. 3, 1967, Ser. No. 606,581
Claims priority, application Germany, Jan. 12, 1966, F 48,145
Int. Cl. C08g 51/56
U.S. Cl. 260—45.75                             6 Claims

ABSTRACT OF THE DISCLOSURE

Stabilized polyamides having recurring amide linkages in the polymer chain, containing as a stabilizer a cyano complex of monovalent copper of the formula $$Me_y[Cu(CN)_x]$$

wherein:
$x$ is 2–6

$y$ is $\dfrac{x-1}{\text{valency of Me}}$ and
Me is potassium or sodium.

---

This invention relates to stabilised polyamides containing copper compounds as stabilisers. Shaped articles of polyamides which have been obtained by polymerisation both of diamines and dicarboxylic acids and of amino carboxylic acids or their lactams, e.g. threads, bristles, foils etc., are deleteriously affected by the action of air and oxygen, especially at elevated temperatures, so that their relative viscosity drops and their mechanical strength and stretching characteristics deteriorate. At the same time the polyamide is subject to an increasingly brown discolouration.

It is known that polyamides can be protected against the deleterious influence of air and oxygen at elevated temperatures by the addition of stabilisers. The following compounds have been proposed as stabilisers: Manganese salts of inorganic and organic acids; copper salts of inorganic and organic acids; derivatives of oxy acids of phosphorus and aromatic amines and phenols. Preferably, combinations of these groups of compounds are used, with each other or with compounds which on their own have no stabilising effect, such as alkali metal halides, alkaline earth halides, iodine, arylsulphonic acids etc.

The stabilisers used hitherto have the disadvantages either that their stabilising effect is not sufficient, e.g. in the case of manganese salts, phosphorus compounds and phenols, or that they are sensitive to light and therefore cause discolouration of the polyamide in the course of time. Examples of such stabilisers are aromatic amines and phenols.

The addition of copper salts, which in themselves are very effective stabilisers, also generally leads to discolouration of the polyamide. In addition, when polyamides stabilised with conventional copper stabilisers are dryed with cadmium sulphide or cadmium selenide pigments, it is not possible to obtain pure colour tones but only dirty yellowish, orange and red colour tones due to small quantities of sulphides or selenides of mono- or divalent copper produced as a result of the reaction between copper compounds and pigments, and the stabilising effect is therefore reduced in proportion to the extent of discolouration. A primary object of the present invention is a stabilised polyamide having recurring amide linkages in the polymer chain, containing a cyano complex of monovalent copper of the formula $Me_y[Cu(CN)_x]$ wherein $x=2$–6, $$y = \dfrac{x-1}{\text{valency of Me}}$$

and Me is a member of the group consisting of an alkali metal, an alkaline earth metal and a strongly basic ammonium compound, said cyano complex of monovalent copper being incorporated with the polyamide in an amount such that the copper is present in the range of 0.0001 to 0.2% of the weight of the polyamide. An other object is a stabilised polyamide having recurring amide linkages in the polymer chain containing (a) a cyano complex of monovalent copper of the formula $Me_y[Cu(CN)_x]$ wherein $x=2$–6, $$y = \dfrac{x-1}{\text{valency of Me}}$$

and Me is a member of the group consisting of an alkali metal, an alkaline earth metal and a strongly basic ammonium compound and (b) an iodine compound.

In general, it has now been found that polyamides can be stabilised and at the same time the above-mentioned disadvantages be avoided if stable cyano complexes of monovalent copper of the general formula $$Me_y[Cu(CN)_x]$$

wherein $x=2$–6, $$y = \dfrac{x-1}{\text{valency of Me}}$$

and Me is an alkali metal/or an alkaline earth metal or a strongly basic ammonium compound are used as stabilisers. Furthermore a process of stabilising linear synthetic polyamides has been found, which comprises incorporating in a polyamide having recurring amide linkages in the polymer chain a cyano complex of monovalent copper of the formula $Me_y[Cu(CN)_x]$ wherein $x=2$–6, $$y = \dfrac{x-1}{\text{valency of Me}}$$

and Me is a member of the group consisting of an alkali metal, an alkaline earth metal and a strongly basic ammonium compound together with an iodine compound. Examples of such copper complexes are potassium dicyanocuprate-(I); sodium dicyanocuprate-(I); potassium tetracyanocuprate-(I); sodium tetracyanocuprate-(I); and barium tricyanocuprate-(I).

The copper complexes are advantageously added in such quantities as to give a copper content in the polyamide of 0.0001–0.2, preferably 0.001–0.02% by weight. An increase in the stabilising effect is achieved by the addition of iodine compounds and/or phosphorus compounds which in themselves have only a very slight stabilising effect or no effect at all, e.g. by the addition of alkali metal iodides, iodides of strong organic bases, alkyl iodides, aryl iodides, phosphites and phosphines.

The stabilisers may be added to the polyamide-forming starting mixture, if desired in the form of an aqueous solution, prior to polymerisation and polymerisation may then be carried out in known manner, either continuously or intermittently, without any discolouration of the polyamide melt occurring.

On the other hand, the stabilisers, if desired in the form of a concentrate in the polyamide, may be added to the polyamide melt only during or after polymerisation; conventional mixing apparatus such as extruders, kneading apparatus, etc. may be used for this purpose.

In addition to copper-I-cyano complex stabilisers, the polyamides may also contain the usual additives such as pigments, dyestuffs, light stabilisers, fillers such as glass fibres or asbestos fibres, lubricants and mould parting agents and crystallisation promoters.

The polyamides stabilised according to the invention which are stabilised especially against damage by oxidation at elevated temperatures, are eminently suitable for the production of industrial silks for fishing nets, drive belts, conveyor bands, tyre cords and shaped articles which are exposed to thermal stress in the presence of air or oxygen, especially in cases where it is required to use polyamides in pale ivory, yellow, and red colour tones containing cadmium pigments.

EXAMPLE 1

1 kg. of a colourless polycaprolactam of relative viscosity 3.12 (determined in a 1% solution in m-cresol) which has been prepared by the usual method is melted in a conventional screw press and homogeneously mixed with different stabilisers. The polycaprolactam containing stabilisers is spun to form a bristle of about 3 mm. in diameter, chopped up into a granulate and dried. The granulate is then stored in a drying cupboard at 150° C. with free access to air and the relative viscosity is determined after 144, 500 and 1000 hours. The results of the tests are indicated in Table I.

TABLE I

| Sample No. | Cu-stabiliser | Gram | Percent Cu in the polyamide | Further additives | | Colour of polyamide | Relative viscosity after— | | | |
|---|---|---|---|---|---|---|---|---|---|---|
| | | | | Grams | Percent | | Mixing | 144 hours | 500 hours | 1,000 hours |
| 1 | Na$_3$[Cu(CN)$_4$] | 0.45 | 0.012 | | | Colourless | 3.16 | 3.14 | 2.84 | 2.60 |
| 2 | K$_3$[Cu(CN)$_4$] | 0.50 | 0.012 | | | do | 3.12 | 3.12 | 2.78 | 2.58 |
| 3 | K$_3$[Cu(CN)$_4$] | 0.25 | 0.006 | | | do | 3.17 | 3.16 | 2.75 | 2.54 |
| 4 | K$_3$[Cu(CN)$_4$] | 1.0 | 0.024 | | | do | 3.15 | 3.26 | 2.85 | 2.64 |
| 5 | K[Cu(CN)$_2$] | 0.27 | 0.012 | | | do | 3.14 | 3.28 | 2.93 | 2.66 |
| 6 | K$_3$[Cu(CN)$_4$] | 0.50 | 0.012 | KI 5 | 0.5 | do | 3.08 | 4.36 | 3.78 | 3.31 |
| 7 | K$_3$[Cu(CN)$_4$] | 0.50 | 0.012 | KI 10 | 1.0 | do | 3.07 | 4.05 | 3.86 | 3.56 |
| 8 | K[Cu(CN)$_2$] | 0.27 | 0.012 | KI 5 | 0.5 | do | 3.10 | 4.26 | 3.92 | 3.74 |
| 9 | K[Cu(CN)$_2$] | 0.27 | 0.012 | KI 2 | 0.2 | do | 3.18 | 3.96 | 3.66 | 3.48 |
| 10 | | | | | | do | 3.09 | 2.73 | 2.36 | 2.18 |

EXAMPLE 2

The procedure is carried out as described in Example 1 except that 3.5 g. of a cadmium sulphide (Yellow 6G) is mixed into the polyamide at the same time as the stabiliser. The colour tones of the products obtained are indicated in Table II.

TABLE II

| Sample No. | Cu-stabiliser | Gram | Percent Cu in the polyamide | Further additives | | Colour tone of polyamide |
|---|---|---|---|---|---|---|
| | | | | Grams | Percent | |
| 1 | | | | | | Pure yellow. |
| 2 | K$_3$[Cu(CN)$_4$] | 0.50 | 0.012 | | | Pure yellow, like sample 1. |
| 3 | Na$_3$[Cu(CN)$_4$] | 0.45 | 0.012 | | | Do. |
| 4 | K$_3$[Cu(CN)$_4$] | 0.50 | 0.012 | KI 5 | 0.5 | Do. |
| 5 | K$_3$[Cu(CN)$_4$] | 0.50 | 0.012 | KI 10 | 1.0 | Do. |
| 6 | K$_3$[Cu(CN)$_4$] | 0.50 | 0.012 | Triphenylphosphine 0.5 | 0.05 | Do. |
| 7 | K$_3$[Cu(CN)$_4$] | 0.50 | 0.012 | Tridecylphosphite 1.0 | 0.1 | Do. |
| 8 | Cu(I)Cl | 0.17 | 0.012 | | | Dirty, yellow brown. |
| 9 | Cu(I)I | 0.33 | 0.012 | | | Do. |
| 10 | Cu(I)I | 0.33 | 0.012 | KI 5 | 0.5 | Do. |
| 11 | Cu(I)I | 0.33 | 0.012 | Triphenylphosphine 0.5 | 0.05 | Do. |
| 12 | Cu(I)I | 0.33 | 0.012 | Tridecylphosphite 1.0 | 0.1 | Do. |
| 13 | Cu(II)-acetate × 1H$_2$O | 0.34 | 0.012 | | | Do. |
| 14 | Cu(I)CN | 0.15 | 0.012 | | | Do. |

EXAMPLE 3

A mixture of 1.0 kg. caprolactam, 35 g. ε-aminocaproic acid and copper stabiliser is polycondensed in an autoclave in the usual manner at a temperature of 270° C. The colour of the polyamides obtained is indicated in Table III.

TABLE III

| Sample No. | Cu-stabiliser | Gram | Percent Cu in polyamide | Further additives | Grams | Percent | Colour of polyamide |
|---|---|---|---|---|---|---|---|
| 1 | K$_3$[Cu(CN)$_4$] | 0.50 | 0.012 | | | | Colourless. |
| 2 | K$_3$[Cu(CN)$_4$] | 1.0 | 0.024 | | | | Do. |
| 3 | Na$_3$[Cu(CN)$_4$] | 0.45 | 0.012 | | | | Do. |
| 4 | K[Cu(CN)$_2$] | 0.27 | 0.012 | | | | Do. |
| 5 | CuCl$_2$.2H$_2$O | 0.32 | 0.012 | | | | Green. |
| 6 | Cu(II).acetate H$_2$O | 0.34 | 0.012 | | | | Reddish grey. |
| 7 | Cu(I) Br | 0.16 | 0.012 | | | | Bluish grey. |
| 8 | Cu(I) Br | 0.27 | 0.012 | | | | Greenish grey. |
| 9 | Cu(I) CN | 0.16 | 0.012 | Tridecylphosphite | 1.0 | 0.1 | Reddish brown. |
| 10 | Cu(I) CN | 0.16 | 0.012 | Phosphorous acid | 0.3 | 0.03 | Do. |
| 11 | Cu(II)-acetate.H$_2$O | 0.34 | 0.012 | Tridecylphosphite | 1.0 | 0.1 | Bluish red. |
| 12 | do | 0.34 | 0.012 | Phosphorous acid | 0.3 | 0.03 | Greyish black. |
| 13 | CuCl$_2$.2H$_2$O | 0.32 | 0.012 | KI | 5.0 | 0.5 | Green. |

What we claim is:

1. A stabilized polyamide having recurring amide linkages in the polymer chain containing a cyano complex of monovalent copper of the formula $$Me_y[Cu(CN)_x]$$

wherein:

$x$ is 2–6

$y$ is $\dfrac{x-1}{\text{valency of Me}}$ and

Me is a member selected from the group consisting of potassium and sodium, said cyano complex of monovalent copper being incorporated with the polyamide in an amount such that the copper is present in the range of 0.0001 to 0.2% by weight of the polyamide.

2. The stabilized polyamide of claim 1 wherein said polyamide is polycaprolactam.

3. The stabilized polyamide of claim 1 wherein said polyamide is a copolymer of caprolactam and ε-aminocaproic acid.

4. The stabilized polyamide of claim 1 wherein said cyano complex of monovalent copper is potassium dicyanocuprate-(I), sodium dicyanocuprate-(I), potassium tetracyanocuprate-(I) or sodium tetracyanocuprate-(I).

5. The stabilized polyamide of claim 4 wherein said cyano complex of monovalent copper is present in an amount such that the copper concentration is from 0.001 to 0.02% by weight of the polyamide.

6. A stabilized polyamide having recurring amide linkages in the polymer chain containing (a) a cyano complex of monovalent copper of the formula $$Me_y[Cu(CN)_x]$$

wherein:
  $x$ is 2–6
  $y$ is $\dfrac{x-1}{\text{valency of Me}}$ and
  Me is a member selected from the group consisting of potassium and sodium,
said cyano complex of monovalent copper being incorporated with the polyamide in an amount such that the copper is present in the range of 0.001 to 0.2% by weight of the polyamide, and (b) 0.2 to 1% by weight, based on the polyamide, of potassium iodide.

References Cited

UNITED STATES PATENTS 2,705,227   3/1955   Stamatoff _____ 260—45.75

FOREIGN PATENTS 906,893   2/1946   France.

DONALD E. CZAJA, Primary Examiner

V. P. HOKE, Assistant Examiner

U.S. Cl. X.R.

260—37, 45.7